Oct. 27, 1953  R. E. BARCLAY  2,657,295
POTENTIOMETER

Filed April 18, 1952  3 Sheets-Sheet 1

INVENTOR.
ROBERT E. BARCLAY
BY HIS ATTORNEYS.
HARRIS, KIECH, FOSTER & HARRIS

Oct. 27, 1953
R. E. BARCLAY
2,657,295
POTENTIOMETER
Filed April 18, 1952
3 Sheets-Sheet 2
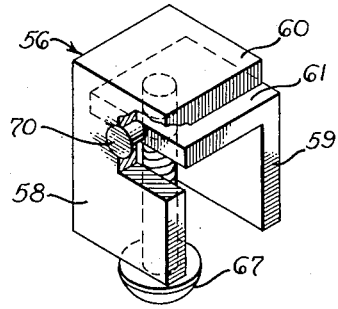
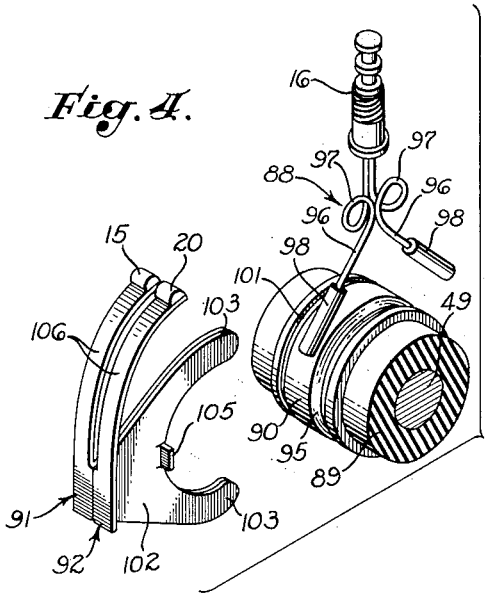
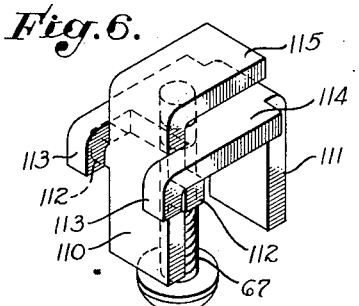
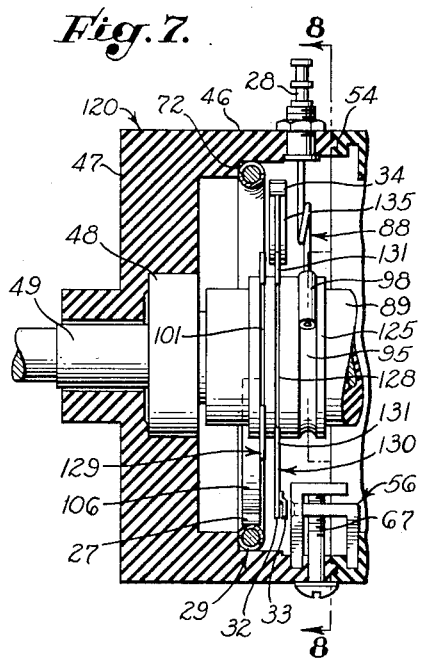
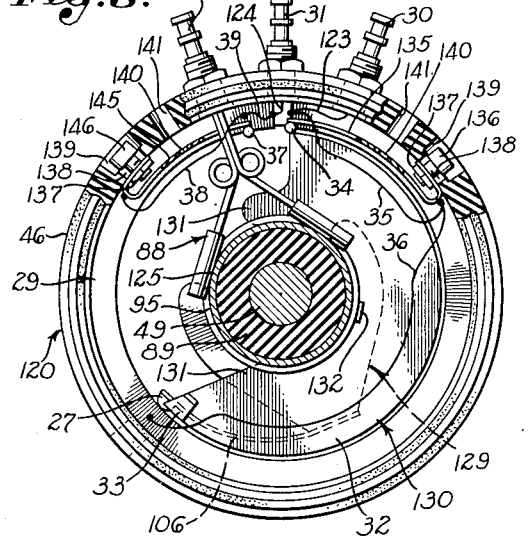
INVENTOR.
ROBERT E. BARCLAY
BY HIS ATTORNEYS.
HARRIS, KIECH, FOSTER & HARRIS
BY
Clarence F. Kiech Oct. 27, 1953  R. E. BARCLAY  2,657,295
POTENTIOMETER
Filed April 18, 1952  3 Sheets-Sheet 3

INVENTOR.
ROBERT E. BARCLAY
BY HIS ATTORNEYS.
HARRIS, KIECH, FOSTER & HARRIS
BY

Patented Oct. 27, 1953

2,657,295

UNITED STATES PATENT OFFICE 2,657,295

POTENTIOMETER

Robert E. Barclay, Los Angeles, Calif., assignor to Helipot Corporation, South Pasadena, Calif., a corporation of California Application April 18, 1952, Serial No. 283,016

34 Claims. (Cl. 201—48)

This invention relates to variable resistance devices such as potentiometers and, more particularly, relates to a rotary type variable resistance device or potentiometer used in various instruments, for example in control devices for aircraft and guided missiles. The term potentiometer as used hereinafter will be understood as pertaining to variable resistance devices in general.

While the invention is broadly appreciable to such devices, it has special utility in a multiple or ganged potentiometer of the rotary type for use in a radar altimeter system for jet propelled aircraft. Such an embodiment of the invention will be described herein for the purpose of disclosure and illustration as well as to provide adequate guidance for those skilled in the art who may have occasion to apply the same principles to other specific purposes.

The general object of the invention is to provide a rugged, efficient, highly accurate potentiometer of relatively simple construction that may be manufactured in quantity with relatively low labor cost for fabrication and assembly.

An important object of the invention is to provide an efficient, trouble-free arrangement for shorting out a predetermined portion of a potentiometer resistor so that constant resistance is maintained over the corresponding portion of the potentiometer action.

The problem is to afford a smooth wiper action throughout the rotary range of the potentiometer with absolutely constant resistance provided between accurately predetermined points of the resistor without the generation of spurious signals or other troublesome phenomena.

At first thought, it would seem practical merely to terminate the helical resistance coil at the desired transition points and to substitute a uniform conductor for the resistor over the range of potentiometer operation where constant resistance is desired. For example, where a helical coil is wound on a metal core with an intervening coating of insulating material, the helical coil may be connected to the core at the transition points with the core exposed for contact with the movable wiper over the desired range of constant resistance. Such a construction is wholly unsatisfactory, however, in control systems and instruments in which exceedingly fine accuracy is of controlling importance and is especially objectionable in systems having exceedingly sensitive control components. With reference to accuracy, an insurmountable fact is that the resistance in the wiper circuit actually varies appreciably as the wiper traverses the so-called constant resistance range. It is exceedingly difficult to terminate the resistance coil at accurately predetermined points and even when such accuracy is attained there remains the troublesome fact that movement of the wiper across the transition point introduces spurious signals. The spurious signals affect operation of the control system and usually are steep front signals of too high magnitude to be tolerated.

Various attempts have been made to solve the problem by having the wiper traverse the helical resistor through the whole range of potentiometer operation with the successive helical turns of the resistor electrically interconnected over the portion of the range in which constant resistance is desired. Such attempts do succeed in providing a smooth wiper action, thus eliminating any spurious signals that are due solely to the wiper action. Unfortunately, however, other difficulties are introduced.

One expedient, for example, is to place a conductor such as a thin wire along the core of the resistor in electrical contact with the successive turns of the helical resistance wire. It is exceedingly difficult to fabricate such a resistor with accurate placement of the transition points, especially so since the helically wound resistance wire tends to press the ends of the inserted conductor into the underlying core material.

Another expedient is to deposit a layer of metal along the helical resistor, the deposited metal interconnecting the successive turns of the helix over the desired range of constant resistance. It has been found, however, that, notwithstanding great care and skill, such a deposit in combination with helical turns does not provide uniform resistance. Consequently the traveling wiper in traversing the shorted portion of the helical resistor creates an undulating signal which is imposed on a control system.

Broadly described, the present invention meets this problem by using a pair of cooperating shorting elements. One of the two elements is fixed relative to the wiper and is electrically connected thereto; the other shorting element is fixed relative to the resistor in spaced relation thereto and is electrically connected thereto. One of the two shorting elements is of elongated configuration and is positioned parallel to the resistor, the length of the elongated element corresponding to the length of that portion of the range of potentiometer operation over which constant resistance is desired. It will be readily understood that either of the two shorting elements may be connected to the wiper with the other connected to the resistor and that either of the two shorting elements may be movable while the other is fixed.

Another object of the invention of primary importance is to provide a construction that is time saving with respect to the task of establishing accurate phase relationships in the course of assembly. The wiper on the rotor must be correctly phased relative to the resistor; one of the two cooperating shorting elements must be accurately related to the wiper; the other must be related with equal accuracy to the resistor; and finally, in any ganged assembly each unit must be accurately phased relative to the other units. A feature of the invention is that it provides for all of these phase adjustments to be readily accomplished in the course of assembly and does so with simple structure and comparatively few parts.

As will be explained, one of the features of the invention with regard to the foregoing is the concept of combining a slip ring on the rotor with a wiper member that may be mounted on the slip ring with a simple snap action without the use of tools. When so mounted the brush member is manually rotatable for phase adjustment and is adapted for fixed anchorage in a convenient manner when such adjustment is accomplished.

A further feature of the invention with respect to phase adjustment, and especially the saving of assembly cost in making phase adjustments, is the concept of making the various units of a ganged potentiometer freely adjustable relative to each other. Such adjustability is afforded by using clamping means of special construction to interconnect the units. The clamping means at the juncture of two potentiometer units is adjustable from the outside and may be loosened to permit relative rotation of the units and may be tightened to permanently fix the units relative to each other.

A further feature of the invention with respect to simplicity of structure and ease of assembly is the concept of employing a resilient brush structure for yielding engagement with a circumferential groove of the above-mentioned slip ring for the purpose of energizing the slip ring and the wiper member carried thereby. In the preferred practice of the invention the wiper structure comprises at least one wire arm, preferably two wire arms, adapted for engagement with the slip ring groove. The brush structure is resilient laterally as well as inwardly so that it may be freely flexed in various ways in the course of assembly without damage. Thus several slip rings may be moved past a brush structure or vice versa with consequent flexing of the brush structure by each slip ring until the desired slip ring is brought into register for permanent co-operation with the brush structure. Such resiliency is a further safeguard against failure of the brush structure under severe service conditions.

The above and other objects and advantages of the invention will be apparent in the following detailed description of the presently preferred practices of the invention, considered with the accompanying drawings.

In the drawings, which are to be regarded as merely illustrative;

Fig. 4 is an exploded view of a slip ring together with the associated wiper structure and brush structure;

Fig. 5 is an enlarged perspective view, partly broken away, showing one form of clamping means for interconnecting potentiometer units;

Fig. 6 is a similar view of a second form of the clamping means;

Fig. 7 is a fragmentary view similar to Fig. 1 showing a second form of the invention;

Fig. 8 is a transverse section taken as indicated by the line 8—8 of Fig. 7.

The principles underlying the use of shorting bars in the construction of potentiometers may be readily understood by considering the diagrams in Figs. 9 to 11c inclusive.

Figure 9:
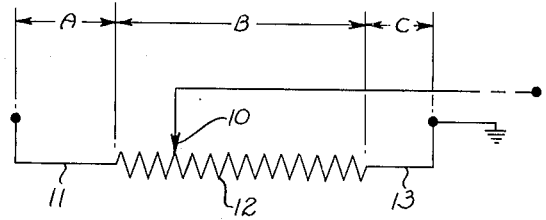
Fig. 9 to 12 are wiring diagrams illustrating the functions of shorting bars in various practices of the invention.

Fig. 9 shows schematically the circuit of a conventional potentiometer in which a wiper 10 is movable over a potentiometer range comprising zone A in which the wiper traverses a conductor 11 for nearly constant resistance in the wiper circuit, zone B where the wiper traverses a resistor 12 for rapidly changing resistance, and zone C where the wiper moves along a second conductor 13 for nearly constant resistance.

Figure 10:
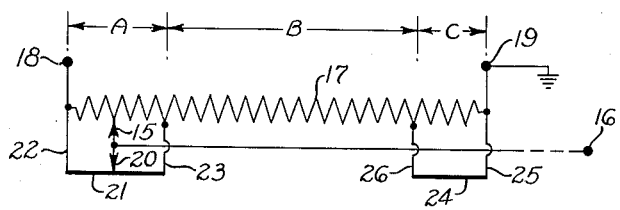

Fig. 10, schematically representing one form of the present invention, shows a resistor wiper 15 connected to a terminal 16, and shows a resistor 17 energized by two resistor terminals 18 and 19. Wiper 15 is in contact with resistor 17 throughout the whole range of potentiometer operation comprising zones A, B, and C but in accord with the teachings of the present invention the resistance in the wiper circuit is varied only in zone B. Thus the potentiometer in Fig. 10 exercises the same control over current flow in the wiper circuit as in the conventional potentiometer of Fig. 9. The shorting of resistor 17 in zone A is accomplished by a pair of co-operating shorting elements comprising an auxiliary wiper 20 and an elongated element or shorting bar 21. The auxiliary wiper 20 is electrically connected with the resistor wiper 15 and is movable synchronously therewith. The shorting bar 21, which is positioned parallel to the resistor 17 throughout the length of zone A, is connected to resistor terminal 18 by a lead 22 and is connected by a lead 23 to resistor 17 at the juncture of zones A and B. At the other end of resistor 17 a second similar element or shorting bar 24 extending throughout the length of zone C is connected to resistor terminal 19 by a lead 25 and is connected by a lead 26 to resistor 17 at the juncture of zones B and C. It is apparent that this arrangement is effective to short out the two end portions of the resistor 17 as the auxiliary wiper 20 traverses the two shorting bars 21 and 24 respectively, and it is also apparent that resistor 17 need not be connected directly to the two terminals 18 and 19 since the two shorting bars provide equivalent connections.

Figure 11A:
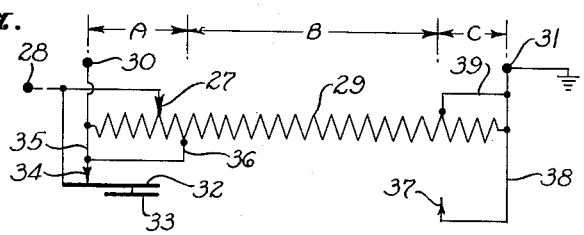
Figure 11B:
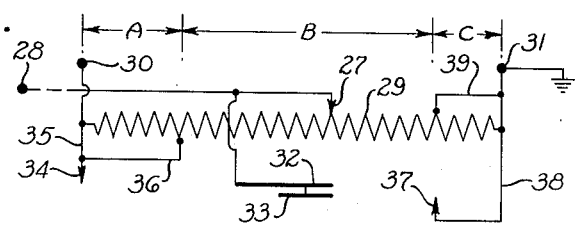
Figure 11C:
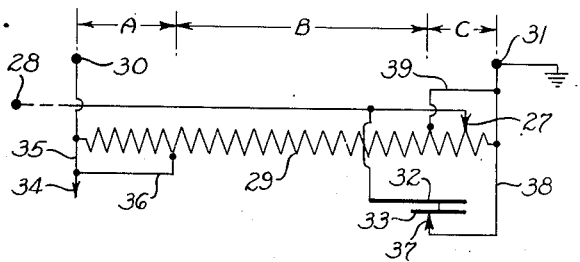

Figs. 11a, 11b and 11c illustrate a second form of the invention employing two cooperating shorting elements, but in this instance the wiper shorting element is stationary and connected to the resistor while the cooperating shorting bar is movable with the primary potentiometer wiper. A resistor wiper 27 is connected to a wiper terminal 28 and a resistor 29 is connected to two terminals 30 and 31. Wiper 27 traverses resistor 29 throughout the whole of zones A, B and C and carries with it a first shorting bar 32, the length of which corresponds to zone A, and a second shorting bar 33 corresponding in length to zone C, the two shorting bars being electrically interconnected. A stationary wiper 34 for cooperation with the first shorting bar 32 is connected to terminal 30 by a lead 35 and is connected by a lead 36 to resistor 29 at the juncture of zones A and B. In similar manner, a second stationary wiper 37 positioned for cooperation with the second shorting bar 33 is connected to terminal 31 by a lead 38 and is connected by a lead 39 to resistor 29 at the juncture of zones B and C. Here again resistor 29 need not be connected to terminals 30 and 31 since the required connections are provided by the leads to the two stationary wipers 34 and 37.

It is apparent in Fig. 11a that the first stationary wiper 34 and the first shorting bar 32 cooperate to short the end portion of resistor 29 corresponding to zone A. Fig. 11b shows wiper 27 in zone B in which zone the two movable shorting bars 32 and 33 are spaced from their corresponding wipers.

Fig. 11c shows the primary wiper 27 in zone C where the second shorting bar 33 is in contact with the second stationary wiper 37 to short the corresponding end portion of resistor 29.

Figs. 1 to 5 show by way of example how a ganged potentiometer may be constructed as an embodiment of my invention with stationary shorting bars to function in the manner indicated by the diagram in Fig. 10.

Figs. 7 and 8 show the construction of a second potentiometer corresponding to the diagrams in Figs. 11a, 11b and 11c.

Figure 1:
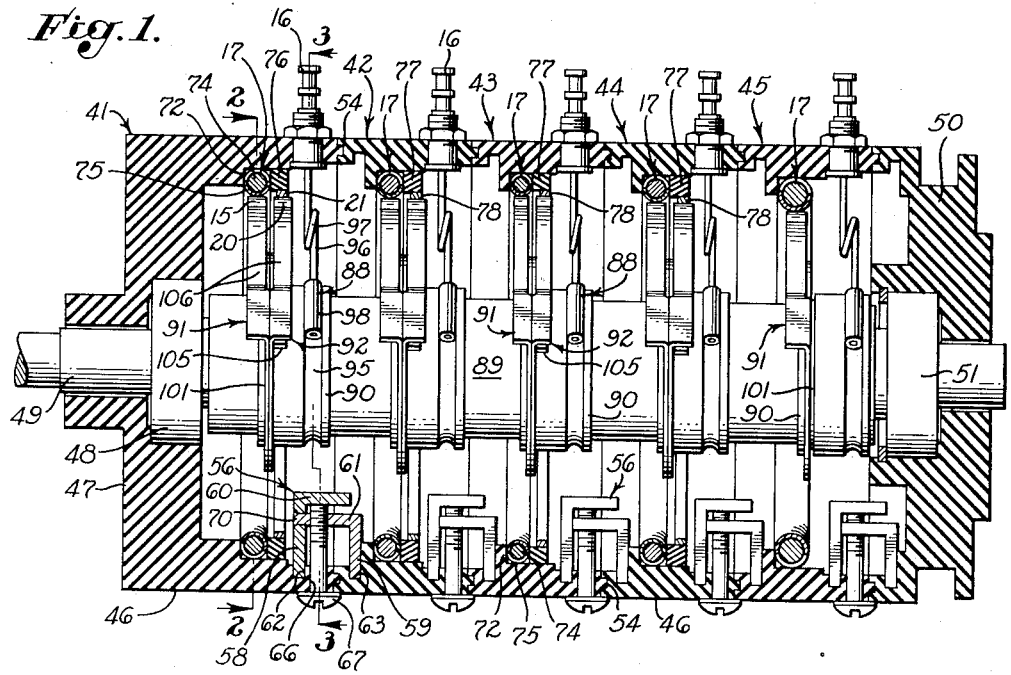
Fig. 1 is a longitudinal sectional view of one form of the invention, the rotor assembly being shown in side elevation.

Fig. 1 shows a ganged potentiometer assembly of cylindrical configuration comprising five potentiometer units designated 41 to 45, each of which has a cylindrical wall 46. The end unit 41 has an end wall 47 integral with its cylindrical wall 46, which end wall carries a suitable antifriction bearing 48 for one end of a rotor shaft 49. At the other end of the assembly a cap 50 or end wall is connected with the end unit 45 to complete the composite casing and to carry a second antifriction bearing 51 for the other end of the rotor shaft.

The potentiometer units 41–45 and the end cap 50 may be held together in assembled relationship in any suitable manner, for example by suitable adhesive at each juncture. In the preferred practice of the invention, however, adjustable clamping means are employed for this purpose, there being at least two such means at each juncture. In the construction shown, one of the pairs of cylindrical walls 46 at each juncture is formed with a tongue 54 to mate with a corresponding groove in the other cylindrical wall and the two cylindrical walls are held together by at least two clamping means generally designated 56.

As shown in Figs. 1 and 5, each clamping means 56 may comprise two clamp members 58 and 59 that are of angular configuration, the two members having inner flanges or legs 60 and 61, respectively, which are turned towards each other in overlapping relationship. One of the clamp members 58 seats in a recess 62 in one of the two cylindrical walls 46 on one side of the juncture and in like manner the other clamp member seats in a recess 63 in the second cylindrical wall on the other side of the juncture. It is contemplated that at least one of the recesses 62 and 63 will be of substantial circumferential extent and for convenience in fabrication both recesses may be in the form of grooves extending around the complete inner circumference of the corresponding cylindrical wall 46.

One of the two adjoining cylindrical walls 46 is provided with a radial hole 66 for each of the clamping means 56, the purpose of the radial hole 66 being to receive a suitable screw 67. It may be noted in Fig. 1 that the radial hole 66 is located between the recess 62 and the juncture with the next adjacent cylindrical wall. The screw 67 is threaded through the inner leg 61 of the clamp member 59 to abut the inner leg 60 of the clamp member 58 and the leg 61 of the clamp member 59 is pivotally connected to the clamp member 58 so that tightening rotation of the screw 67 causes the two clamp members to swing toward each other, thereby clamping the two adjoining potentiometer units together. As best shown in Fig. 5 the pivotal connection of the leg 61 with the clamp member 58 may be accomplished by providing a pin-like extension 70 on the end of the leg to extend loosely through an aperture in the clamp member 58, the outer end of the pin-like extension being peened to prevent separation of the two members.

Each of the cylindrical walls 46 is formed with an internal circumferential shoulder 72 against which is positioned a suitable resistor, generally designated 17, having the configuration of a split ring, this resistor being resistor 17 of Fig. 10. In a preferred practice of the invention each resistor 17 comprises a ring-shaped core 74 on which is wound a helical resistance wire 75. The core 74 may be made of metal coated with suitable insulating material to isolate the resistance wire 75.

In those units of the ganged assembly in which a portion of the resistor 17 is to be shorted, a suitable ring 76 of non-conducting material is mounted adjacent the resistor, which ring carries on its inner circumference one or more arcuate shorting bars. For example, the potentiometer unit 41 has a ring 76 of non-conducting material that carries two arcuate shorting bars 21 and 24 (Fig. 3) that correspond to shorting bars 21 and 24 of Fig. 10. In like manner, units 42, 43 and 44 have non-conducting rings 77 carrying various arcuate shorting bars 78 of precious metal. It will be noted that in each instance the non-conducting rings and the shorting bars are so dimensioned that the inner arcuate surface of each shorting bar will match the inner diameter of the associated resistor. No shorting bar is shown in the last unit 45 since in the particular structure of Fig. 1 it is contemplated that the whole length of the resistor 17 will be active.

The circumferential length of each shorting bar corresponds to the zone or portion of the range of potentiometer operation in which constant resistance is required and each shorting bar is accurately positioned circumferentially in accord with the desired zones. In the construction shown, zone A represented by shorting bar 21, covers 225° of rotation, zone B covers 121°, and shorting bar 24 covers 9° of rotation of the potentiometer. Each shorting bar 21 and 24 is connected to the corresponding zone juncture point of resistor 17 in accord with Fig. 10, the connections being made to the corresponding turns of the helical resistance wire 75. Preferably the connection is made to the mid point of each shorting bar. It is contemplated that the non-conducting ring 76 that carries the shorting bars 21 and 24 will be cut away on its inner circumference to a depth corresponding to the thickness of the shorting bars with the inner cylindrical surface of the ring between shorting bars conforming to the exposed curved faces of the shorting bars. Thus, in Fig. 3 a portion 84 of the non-conducting ring 76 lying between the two shorting bars 21 and 24 and corresponding to zone B of the potentiometer operation presents an inner circumferential surface which is in effect a continuation of the inner surfaces of the two shorting bars.

Each of the potentiometer units has two external terminals 18 and 19 to energize the resistor 17 and has a wiper terminal 16, all in accord with the diagram in Fig. 10. Terminal 16 carries a suitable brush means generally designated 88.

The rotor shaft 49 is part of a rotor assembly which includes a cylindrical rotor body 89 carrying a plurality of slip rings 90, there being one slip ring for each of the potentiometer units. In the preferred construction, the rotor body 89 is formed by molding a suitable non-conducting plastic onto the rotor shaft 49 and the slip rings 90, which are in the form of coin silver sleeves, are bonded to the rotor body by the molding process. Each of the slip rings 90 is suitably adapted to maintain constant contact with the corresponding brush means 88 and on each slip ring is mounted a suitable resistor wiper member 91 carrying a contact or wiper element 15 corresponding to wiper 15 of Fig. 10 for contact with the corresponding resistor 17. In the units which include shorting bars, the slip rings also carry auxiliary wiper members 92 providing the required auxiliary wiper elements 20 for contact with the shorting bars. Thus, the potentiometer unit 41 carries an auxiliary wiper member 92 with a wiper element 20 for cooperation with the two shorting bars 21 and 24.

In the preferred construction shown in the drawings, each slip ring 90 is provided with a shallow circumferential groove 95 for cooperation with the corresponding brush means 88 and the groove has sloping side walls, being preferably of circular curvature in cross-sectional configuration. It is contemplated that the brush means 88 will be of resilient construction not only for the purpose of maintaining pressure contact with the slip ring in the groove 95 in the normal operation of the potentiometer, but also to permit substantial lateral flexure of the brush means in the course of assembly without damage to the brush means. In the construction shown, each brush means 88 comprises a pair of resilient wire arms 96 (Fig. 4) formed with loops 97, the two arms diverging for engagement with the corresponding slip ring at circumferentially spaced points. Preferably each wire arm 96 carries a cylindrical brush element 98 that rides in the groove 95, the periphery of the brush element having the same curvature as the cross-section of the groove.

In the preferred construction of the invention, each of the slip rings 90 is also formed with a second relatively narrower circumferential groove 101 which is of sufficient width to accommodate a primary wiper member 91 alone or a primary wiper member together with an auxiliary wiper member 92. Each of the two wiper members 91 and 92 is of similar construction, each comprising a piece of resilient sheet metal 102 that is cut to form two arms 103, the sheet metal providing a body cut to provide an opening conforming to the inner diameter of the slip ring groove 101. The two arms 103 are dimensioned to extend around or embrace slightly more than half the circumference of the bottom of the groove of the slip ring, as shown somewhat distorted in Figs. 2 and 3 for clarity, so that the ends of the arms converge toward each other with slightly less spacing between the ends of the arms than the inner diameter of the groove 101. For example, the two arms 103 may be dimensioned to embrace 15° more than half the circumference of the slip rings.

By virtue of this construction such a wiper member, which is preferably made of spring bronze, may be assembled to the slip ring by a simple snap action. In the course of this assembly procedure, the two arms 103 are flexed in their common plane or are distorted out of their common plane and return to co-planar alignment at their assembled positions. It is further contemplated that after a wiper member is snapped into position on the slip ring it will have a frictional tendency to hold its rotary position relative to the slip ring, but may be readily shifted circumferentially in the groove 101 to a final assembled position and to correct phase relation with the rotor assembly. Such a wiper member may be anchored in its final assembled position by bonding it to the slip ring by a drop of solder. To facilitate this bonding operation the wiper member may be formed with a suitable lateral lug or tab such as shown at 105 in Fig. 4, the tab being adapted to overlie the surface of the slip ring so that it may be conveniently soldered to the slip ring.

Such a wiper member may be adapted in any suitable manner for contact with the corresponding resistor or shorting bar. In my preferred construction, the wiper member is formed with a resilient contact arm 106 which carries the wiper element at its outer end.

Since no shorting bar is used in potentiometer unit 45, Fig. 1 shows a single resistor wiper member 91 mounted on the corresponding slip ring 90 to cooperate with the corresponding resistor 17. Each of the other potentiometer units is provided with both a resistor wiper member 91 and an auxiliary wiper member 92, the resistor wiper member traversing the corresponding resistor 17 and the auxiliary wiper member traversing one or more shorting bars. Thus, the auxiliary member 92 in potentiometer unit 41 is positioned for contact with the two shorting bars 21 and 24. In such instances in which both a resistor wiper member 91 and an auxiliary wiper member 92 are to be mounted on the same slip ring, the two wiper members may be spot welded together face-to-face in accurate registration prior to assembly as shown in Fig. 4 and then may be snapped into place on the slip ring in the same manner as a single wiper member.

Fig. 6 shows how the clamping means for interconnecting the potentiometer units may be modified by employing a different arrangement for pivotally interconnecting the two clamp members. The two clamp members 110 and 111 are of the same general configuration as heretofore described and cooperate in the same manner with an actuating screw 67. The clamp member 110 is formed with a pair of aligned laterally projecting lugs 112 and the other clamp member 111 is formed with a corresponding pair of angular fingers 113 that engage the lugs 112 in a rotatable manner. Thus, as the screw 67 acting through the leg 114 of the clamp member 111 presses against the leg 115 of the clamp member 110, the two clamp members swing relative to each other about the axis of the lugs 112.

The second form of the invention shown in Figs. 7 and 8 is, in large part, structurally identical with the first form of the invention, but embodies the principle of movable shorting bars exemplified by Figs. 11a, 11b and 11c heretofore described. Structural parts in Figs. 7 and 8 corresponding to the first described form of the invention are identified by corresponding numerals and components in common with the wiring diagrams of Figs. 11a to 11c are designated by corresponding numerals. Here again zone A, the first zone of substantially constant resistance, corresponds to approximately 225° of rotation, the variable resistance zone B corresponds to approximately 121° and the third zone C, where the resistance is again constant, has a length of 9° of rotation.

Figure 2:
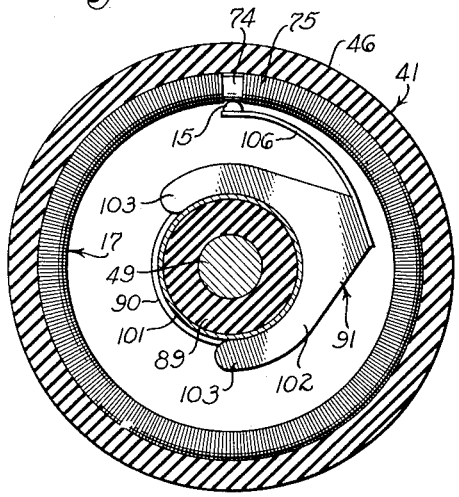
Fig. 2 is a transverse section taken as indicated by the line 2—2 of Fig. 1.
Figure 3:
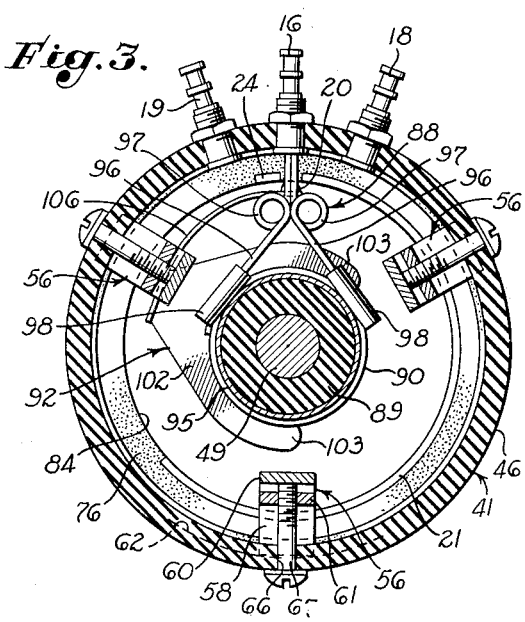
Fig. 3 is a transverse section taken as indicated by the line 3—3 of Fig. 1.

The potentiometer unit 120 of Figs. 7 and 8 is of the same general construction as the potentiometer unit 41 of Figs. 1, 2 and 3, having a similar cylindrical wall 46 and end wall 47. A resistor 29 of the same construction as heretofore described is mounted in the same manner against an internal circumferential shoulder 72. One end of resistor 29 is shown connected to external wiring terminal 30 by a short lead 123 and the other end is connected to terminal 31 by a short lead 124. The third terminal 28 carries the brush means 88 for cooperation with a groove 95 as heretofore explained. The groove 95 is in a slip ring 125 which differs from the previously described slip rings 90 in having a second narrow groove 128 to permit a second wiper member 130 to be mounted at a second location on the slip ring. Thus slip ring 125 carries two wipers spaced laterally apart in two separate grooves instead of one wiper member or two wiper members in the same groove. One wiper member generally designated 129 carries the wiper element or moving contact 27 which is the previously mentioned primary wiper 27 of Figs. 11a to 11c. In Fig. 8 the wiper element 27 is mounted on the usual flexible contact arm 106.

The second wiper member 130 on the slip ring 125 has a circular wiper edge 32 of 125° extent which serves as a movable shorting bar and corresponds to the shorting bar 32 of Figs. 11a to 11c. The wiper member 130 that serves as a movable shorting bar is mounted in the narrow groove 128 in the same manner as wiper members heretofore described. Thus wiper member 130 is formed with two arcuate arms 131 to embrace slightly more than half of the inner circumferential extent of the narrow groove 128 and the wiper member is made of flexible sheet metal such as bronze spring metal to permit the wiper member to be assembled to the slip ring with a snap action as heretofore described. When the wiper member is snapped onto the slip ring it may be readily rotated to a final position of accurate phase adjustment and then, as heretofore described, may be permanently fixed in position by soldering a laterally extending lug or tab 132 to the slip ring.

Figs. 11a to 11c show a second shorting bar 33 of substantially smaller extent that is movable with the longer shorting bar 32 and is electrically connected thereto, the two shorting bars moving along two separate paths. In Figs. 7 and 8 the second shorting bar 33 is in the form of a small offset piece of sheet metal fixedly mounted on one face of the wiper member 130. This second shorting bar 33 has a peripheral extent of 9° to conform to zone C.

The first stationary wiper 34 of Figs. 11a to 11c for cooperation with the longer shorting bar 32 is shown in Fig. 8 as a small contact member on the end of a flexible conducting arm 135 that is carried by what may be termed an adjustable dummy terminal 136. The conducting arm 135 is bent to the form shown and has spot welded thereto a suitable nut 137. The dummy terminal 136 is in the form of a screw that extends through the cylindrical wall 46 of the potentiometer unit into engagement with the nut 137. The dummy terminal is adjustable by virtue of the fact that it extends through a slot 138. Preferably, the cylindrical wall of the potentiometer unit is cut away to form a recess 139 to receive the head of the screw or dummy terminal 136. Once the screw is adjusted to its final position and thoroughly tightened, the recess may be completely filled with a suitable sealing material.

To facilitate adjustment of the stationary wiper 34, the conducting arm 135 on which the wiper 34 is mounted may have a small aperture 140 which is accessible through a hole 141 in the cylindrical wall 46. With the screw 136 loosened, it is a simple matter to insert a suitable tool through the hole 141 into engagement with the aperture 140 to shift the wiper 34 to an accurately determined position, whereupon the dummy terminal may be tightened and sealed.

Fig. 8 shows leads 35 and 36 corresponding to the same wires in Figs. 11a to 11c. Thus the stationary wiper 34 shorts the end of resistor 29 conforming to the length of the shortening bar 32 which determines the length of zone A.

The second stationary wiper 37 of Figs. 11a to 11c that cooperates with the second shorting bar 33 is shown in Fig. 8 in the form of a contact 37 mounted on a conducting arm 145 that is similar to the above described conducting arm 135 and is mounted in the same manner on an adjustable dummy terminal 146. As heretofore described, the screw or dummy terminal 146 sets in a second recess 139 and extends through a slot 138 into a nut 137 that is united with the conducting arm 145. The conducting arm 145 has an aperture 140 as heretofore described which may be engaged by a suitable tool extending through a second hole 141 in the circumferential wall of the unit.

Fig. 8 also shows leads 38 and 39 for connecting the conducting arm 145 with the end of the resistor 29 and with a second point on the resistor spaced 9° from the end to correspond to the 9° of the shortening bar 32 which determines the extent of zone C.

As heretofore pointed out with reference to Figs. 11a to 11c, it is not necessary to connect resistor 29 directly to terminals 30 and 31. Thus in Fig. 8, wires 35 and 123 may be connected to each other apart from the resistor and in like manner wires 39 and 124 may be connected to each other independent of the resistor.

The operation of the potentiometer shown in Figs. 7 and 8 may be readily understood in the light of the diagrams 11a, 11b and 11c. The wiper element 27 moves against the inner circumferential surface of the resistor 29 throughout the range of potentiometer operation. It will be noted in Fig. 8 that wiper element 27 is in exact phase with the leading edge of both shorting bars 32 and 33 as required by the diagrams in Figs. 11a to 11c. Throughout 225° of clockwise rotation of the rotor assembly to move the wiper 27 from a starting position corresponding to the position of fixed wiper 34, shorting bar 32 remains in contact with fixed wiper 34, thus shorting 225° of the resistor 29. Fig. 8 shows the wiper 27 on the point of leaving zone A to enter the 121° of zone B in which the wiper 27 varies the resistance in the wiper circuit. Throughout zone B the two shorting bars 32 and 33 are spaced away from the corresponding fixed wipers 34 and 37 as shown in Fig. 11b. Upon entering the third zone C represented by Fig. 11c, the shorting bar 33 establishes contact with fixed wiper 37 and thereby shorts out the last 9° of resistor 29.

An outstanding feature of this second form of the invention is that the length of the conducting path through a shorting bar does not change as the shorting bar moves, since current may be considered as flowing radially from the slip ring 125 through the wiper member 130 to the stationary contact 34.

Figure 12:
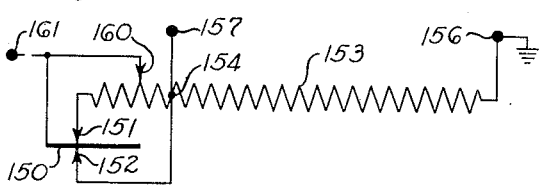

Fig. 12 shows diagrammatically how a shorting bar 150 may serve, in effect, as a shorting switch in cooperation with the stationary wipers 151 and 152. Wiper 151 is connected to one end of a potentiometer resistor 153 and wiper 152 is connected to an intermediate tap 154 of the resistor.

One terminal 156 is connected to the other end of the resistor 153 and a second terminal 157 is connected to the tap 154. The usual movable wiper 160 that traverses the length of the resistor 153 is connected to the shorting bar 150 as shown and is also connected to the usual wiper terminal 161.

It is apparent that as wiper 160 moves along the resistor 153 in the region between stationary wiper 151 and tap 154 as indicated in the drawing, the shorting bar 150 cooperates with the two sttaionary wipers 151 and 152 to maintain substantially constant resistance in the wiper circuit, the shorting bar being of the same length as the portion of the resistor between wiper 151 and tap 154.

While I have elected to describe my invention as embodied in a rotary type potentiometer, it is obvious that the same principles are applicable to helical potentiometers as well as potentiometers that operate with straight-line relative motion. It is also apparent that my specific disclosure of the presently preferred practices of the invention will suggest to those skilled in the art various changes, substitutions and other departures that properly lie within the spirit and scope of my appended claims.

I claim as my invention:

1. In a rotary variable resistance device, the combination of: a curved resistor; a wiper in contact with said resistor; actuating means to cause relative rotation between said resistor and wiper about a given axis; a pair of shorting elements adapted for relative rotary motion about the same axis to move into and out of mutual contact, one of said shorting elements being fixed relative to said resistor and electrically connected to the resistor to short a portion thereof and the other of said elements being fixed relative to said wiper and electrically connected thereto, one of said shorting elements being elongated concentrically of said axis to correspond to said portion of the resistor whereby relative movement between said two shorting elements occurs synchronously in accord with relative movement between the wiper and resistor, said two shorting elements being positioned relative to each other for mutual contact as said wiper traverses said portion of the resistor thereby to short said portion.

2. A variable resistance device as set forth in claim 1 in which said elongated shorting element is fixed relative to the resistor and is connected thereto.

3. A variable resistance device as set forth in claim 1 in which the resistor together with the elongated shorting element is fixed and the wiper together with the other shorting element is movable.

4. A variable resistance devise as set forth in claim 1 in which said elongated shorting element is fixed relative to said wiper and is connected thereto.

5. A variable resistance device as set forth in claim 1 in which the elongated shorting element together with the wiper is movable and the resistor together with the other shorting element is fixed.

6. In a rotary variable resistance device, the combination of: a casing; a curved resistor in said casing; a rotor in the casing; a wiper carried by said rotor in contact with said resistor; a curved shorting element carried by said rotor, said element being electrically connected with said wiper and having a curved extent corresponding to a portion of said resistor; and a stationary shorting contact in the path of rotation of said curved shorting element, said contact being connected to said resistor to short said portion and being adjustably mounted on said casing for accurate placement at a position corresponding to one end of said portion.

7. In a rotary variable resistance device, the combination of: a fixed curved resistor; a rotary slip ring having a circumferential groove; brush means in contact with said slip ring; and a wiper for electrically connecting said slip ring with said resistor, said wiper having a pair of arms to embrace said slip ring in said groove for rotary adjustment on the slip ring, said arms being resilient and the outer ends of the arms converging to a distance of separation less than the inner diameter of said groove whereby the wiper may be assembled to the slip ring with a snap action.

8. A rotary variable resistance device as set forth in claim 7 in which said arms are formed by a single sheet of resiliently flexible metal whereby said arms normally lie in the same plane and flex out of said plane for said snap action.

9. A rotary variable resistance device as set forth in claim 7 in which said wiper has a laterally projecting portion overlying the surface of said slip ring for bonding to the slip ring to fix the rotary position of the wiper on the slip ring.

10. In a rotary variable resistance device, the combination of: a fixed curved resistor; a fixed curved shorting element concentric to the resistor and electrically connected thereto; a rotor including a slip ring; fixed brush means in contact with said slip ring; and two wipers carried by said rotor for electrically connecting said slip ring with said resistor and shortng element respectively.

11. A variable resistance device as set forth in claim 10 in which each of said wipers has a pair of arms to embrace said slip ring for rotary adjustment on the slip ring, said arms being resilient and conforming to more than half of the circumference of the slip ring whereby each wiper may be assembled to the slip ring with a snap action.

12. A variable resistance device as set forth in claim 11 in which said slip ring has at least one circumferential groove and each of said wipers embraces the slip ring in a groove therein.

13. A variable resistance device as set forth in claim 12 in which the arms of each of said wipers are formed by a single sheet of resiliently flexible sheet metal whereby said arms normally lie in the same plane and flex out of said plane for said snap action.

14. A variable resistance device as set forth in claim 13 in which said two wipers are bonded together and are seated in the same circumferential groove in said slip ring.

15. A variable resistance device as set forth in claim 14 in which one of said wipers has a laterally projecting portion overlying the surface of said slip ring for bonding to the slip ring to fix the rotary position of both wipers.

16. In a rotary variable resistance device, the combination of: a fixed curved resistor; a rotary slip ring having a circumferential groove; a wiper for rotation with said slip ring to electrically connect the slip ring with said resistor; and brush means in contact with said slip ring, said brush means having an arm in the form of a resilient wire to make contact with said groove, said wire being formed with a loop to increase its resiliency.

17. In a rotary variable resistance device, the combination of: a plurality of spaced fixed curved resistors; a rotor; a corresponding plurality of slip rings mounted on said rotor, each of said slip rings having a circumferential groove; a corresponding plurality of wipers carried by said rotor for electrically connecting said slip rings with the corresponding resistors; and a corresponding plurality of fixed brush means in contact with the slip rings respectively, each of said brush means having a resilient arm for yielding engagement with the groove in the corresponding slip ring, said grooves having sloping side walls to permit said arms to slide across the grooves of non-corresponding slip rings upon relative movement therebetween in the course of assembly of the variable resistance device.

18. A variable resistance device as set forth in claim 17 in which each of said brush means has a pair of divergent arms for contact with the corresponding groove at spaced points.

19. A variable resistance device as set forth in claim 18 in which each of said arms is made of resilient wire with a loop formed therein for increased resiliency.

20. A variable resistance device as set forth in claim 17 in which the portion of each arm for contact with a groove is cylindrically curved and the cross-sectional configuration of the groove has substantially the same radius of curvature.

21. A variable resistance device as set forth in claim 20 in which each brush means comprises two such arms positioned divergently to contact the corresponding groove at circumferentially spaced points.

22. A variable resistance device as set forth in claim 21 in which each of said arms comprises a resilient wire with a cylindrical enlargement for contact with said groove.

23. A variable resistance device as set forth in claim 22 in which each of said wire arms is formed with a loop for increased resiliency.

24. In a ganged variable resistance device of the character described having a plurality of curved resistor members, a corresponding plurality of wiper members and a rotor carrying one of said pluralities, the combination of: a corresponding plurality of cylindrical walls fixedly carrying and enclosing the other of said pluralities, said cylindrical walls being positioned end-to-end to form a composite cylindrical casing, each cylindrical wall at each juncture of a pair of the cylindrical walls having inner recesses spaced inward from the juncture to provide a plurality of pairs of recesses at each juncture, one of said cylindrical walls at each juncture having a plurality of holes between its recess and its edge; a plurality of pairs of inner clamp members interconnecting each pair of said cylindrical walls, each of said pairs of clamp members engaging the two recesses of a pair of recesses in adjacent cylindrical walls; and a screw operatively connected to each pair of clamp members to tighten or loosen the clamp members, each of said screws extending through one of said holes for rotary adjustment from the exterior to permit rotary adjustment of one of said cylindrical walls relative to the other at a juncture after the cylindrical walls are initially assembled together.

25. A combination as set forth in claim 24 in which said clamp members of each of said pairs thereof have overlapping inner angular portions that are pivotally interconnected and in which the corresponding screw has a head engaging the exterior of the cylindrical wall and is threaded through one of said angular portions against the other angular portion thereby to tighten the two clamp members together.

26. A combination as set forth in claim 25 in which said two clamp members are L-shaped in configuration with their inner legs overlapping and with the inner leg of one clamp member pivotally connected to the other clamp member.

27. In a variable resistance device, the combination of: a curved resistor; a rotor; a first wiper carried by said rotor to traverse said resistor; a stationary wiper connected to said resistor to short a curved portion of the resistor; and a curved shorting means carried by said rotor for contact with said stationary wiper, said shorting means being of the same curved extent as said curved portion of the resistor and being positioned on said rotor relative to said first wiper for contact with said stationary wiper when said first wiper traverses said portion of the resistor.

28. A variable resistance device as set forth in claim 27 in which said curved shorting means has a wall extending radially outward from said rotor in a plane of rotation for current flow between the rotor and the stationary wiper in a direction substantially radial with respect to the rotor.

29. In a variable resistance device, the combination of: a resistor having an active portion and an inactive end portion; a movable wiper to traverse substantially the whole length of said resistor; a shorting bar movable with said wiper and electrically connected thereto, said shorting bar corresponding in length to said inactive end portion of the resistor; and a pair of stationary wipers connected to the opposite ends of said inactive end portion of the resistor, said pair being positioned to contact the leading end of said shorting bar when said movable wiper reaches said inactive portion of the resistor whereby the shorting bar completes a shorting circuit through said two stationary wipers as long as said movable wiper is in contact with said inactive portion of the resistor.

30. In a variable resistance device of the type having a resistor member and a wiper member in wiping contact therewith throughout a given range of relative movement between said members, a shorting means for such variable resistance device for providing substantially constant resistance over a first portion of said range and a varying resistance over a second portion of such range, said shorting means including two shorting elements positioned for mutual wiping contact and respectively fixed relative to and electrically connected to said resistor member and said wiper member to cause relative wiping movement between said shorting elements upon relative movement between said wiper member and said resistor member, one of said two shorting elements being elongated to a length corresponding to said first portion of said range, said two shorting elements being positioned relative to each other for mutual wiping contact throughout relative movement of said resistor and wiper members in said first portion of said range thereby to short said resistor member throughout said first portion of said range.

31. A variable resistance device as defined in claim 30, in which said elongated shorting element and said resistor member are positioned side by side.

32. A variable resistance device as in claim 31, in which said resistor member and said elongated shorting element are each of a form arcuate with respect to an axis, and in which said resistor member and said elongated shorting element respectively provide inner surfaces of substantially the same radius from said axis and respectively engaged by said wiper member and the other of said shorting elements.

33. In a rotary variable resistance device, the combination of: a fixed curved resistor concentric with an axis; a rotor and means for journaling same to turn about said axis, said rotor having a circumferential groove having a bottom wall; a wiper for slidably engaging said curved resistor; and means for adjustably connecting said wiper to said rotor, said last-named means including a pair of arms on said wiper extending in said circumferential groove and frictionally embracing said bottom wall for angular adjustment of said wiper on said rotor, said arms being resilient and encircling slightly more than one-half said bottom wall, the outer ends of said arms converging to a distance of separation slightly less than the diameter of said bottom wall, said wiper being movable sidewise towards said rotor during assembly therewith, said arms flexing during such assembly as their outer ends traverse the diametrical dimension of said bottom wall.

34. In a rotary variable resistance device, the combination of: a fixed curved resistor concentric with an axis; a rotor and means for journaling same to turn about said axis, said rotor having a circumferential wall; and a wiper for slidably engaging said curved resistor, said wiper providing a body formed of resilient sheet material and having a sidewardly open circular opening of substantially the same diameter as said circumferential wall, said body providing at least one arm bounding said opening, the end of said arm being spaced from an opposed portion of said body a distance slightly less than the diameter of said circumferential wall, said arm and said body lying in the same plane, said arm flexing out of said plane as said wiper is assembled laterally on said rotor and as said end of said arm and said opposed portion slip past the mid-plane of said rotor.

ROBERT E. BARCLAY.

References Cited in the file of this patent
UNITED STATES PATENTS

| Number | Name | Date |
|---|---|---|
| 2,573,122 | Weber | Oct. 30, 1951 |